United States Patent
Selwan (10) Patent No.: US 11,392,385 B2
(45) Date of Patent: Jul. 19, 2022

(54) SYSTEM AND METHOD FOR AUTO-RECOVERY IN LOCKSTEP PROCESSORS

(71) Applicant: Microchip Technology Inc., Chandler, AZ (US)

(72) Inventor: Pierre Selwan, Fremont, CA (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 17/075,493

(22) Filed: Oct. 20, 2020

(65) Prior Publication Data

US 2021/0373898 A1 Dec. 2, 2021

Related U.S. Application Data

(60) Provisional application No. 63/030,201, filed on May 26, 2020.

(51) Int. Cl.
| | |
|---|---|
| *G06F 9/30* | (2018.01) |
| *G06F 9/38* | (2018.01) |
| *G06F 30/398* | (2020.01) |
| *G06F 13/20* | (2006.01) |
| *G06F 9/52* | (2006.01) |

(52) U.S. Cl.
CPC .............. *G06F 9/3836* (2013.01); *G06F 9/52* (2013.01); *G06F 13/20* (2013.01)

(58) Field of Classification Search
None
See application file for complete search history.

(56) References Cited

U.S. PATENT DOCUMENTS

| | | |
|---|---|---|
| 5,526,025 A | 6/1996 | Selwan et al. |
| 5,903,283 A | 5/1999 | Selwan et al. |
| 6,172,538 B1 | 1/2001 | Selwan |
| 6,393,582 B1 | 5/2002 | Klecka et al. |
| 7,268,755 B2 | 9/2007 | Selwan |
| 7,627,182 B2 | 12/2009 | Vasquez et al. |
| 7,876,313 B2 | 1/2011 | Selwan et al. |
| 2002/0073357 A1 | 6/2002 | Dhong et al. |
| 2004/0189570 A1 | 9/2004 | Selwan |
| 2006/0136672 A1* | 6/2006 | Chaudhry ............. G06F 11/141 714/E11.131 |
| 2007/0160139 A1 | 7/2007 | Vasquez et al. |
| 2008/0079735 A1 | 4/2008 | Selwan et al. |
| 2008/0079739 A1 | 4/2008 | Gupta et al. |
| 2008/0158237 A1 | 7/2008 | Selwan |

(Continued)

OTHER PUBLICATIONS

PCT/US2020/063289, International Search Report and Written Opinion, dated Apr. 13, 2021.

(Continued)

*Primary Examiner* — Hyun Nam
(74) *Attorney, Agent, or Firm* — Glass and Associates; Molly Sauter; Kenneth Glass (57) ABSTRACT

A system and method for monitoring processors operating in lockstep to detect mismatches in pending pipelined instructions being executed by the processors. A lockstep monitor implemented in hardware is provided to detect the mismatches in the pending pipelined instructions executing on the lockstep processors and to initiate an auto-recovery operation at the processors if a mismatch is detected.

18 Claims, 7 Drawing Sheets

(56) References Cited

U.S. PATENT DOCUMENTS

| | | | | |
|---|---|---|---|---|
| 2010/0191845 A1* | 7/2010 | Ginzton | ............... | G06F 9/4856 |
| | | | | 718/1 |
| 2010/0268987 A1 | 10/2010 | Clark et al. | | |
| 2010/0281239 A1* | 11/2010 | Sudhakar | ............. | G06F 9/3891 |
| | | | | 712/226 |
| 2014/0372731 A1* | 12/2014 | Nystad | ................. | G06F 9/3802 |
| | | | | 712/207 |
| 2015/0286595 A1* | 10/2015 | McMenamin | ...... | G06F 11/2092 |
| | | | | 710/264 |
| 2020/0272533 A1* | 8/2020 | Privitt | ................ | G06F 11/0772 |

OTHER PUBLICATIONS

Annie Hudson, UltraSoC launches "any processor" lockstep solution for safety-critical systems, Nov. 29, 2018, web source.

* cited by examiner

| | | | | | Clock Cycle # | | | | | |
|---|---|---|---|---|---|---|---|---|---|---|
| | 0 | 1 | 2 | 3 | 4 | 5 | 6 | 7 | 8 | 9 |
| 0 | IF(0) | ID(0) | EX(0) | MEM(0) | WB(0) | | | | | |
| 1 | | IF(1) | ID(1) | EX(1) | MEM(1) | WB(1) | | | | |
| 2 | | | IF(2) | ID(2) | EX(2) | MEM(2) | WB(2) | | | |
| 3 | | | | IF(3) 300 | ID(3) | EX(3) | MEM(3) | WB(3) 310 | | |
| 4 | | | | | IF(4) | ID(4) | EX(4) | MEM(4) | WB(4) | |
| 5 | | | | | | IF(5) | ID(5) | EX(5) | MEM(5) | WB(5) |
| 6 | | | | | | | ID(6) | ID(6) | EX(6) | MEM(6) |

SYSTEM AND METHOD FOR AUTO-RECOVERY IN LOCKSTEP PROCESSORS

CROSS-REFERENCE TO RELATED APPLICATIONS

The present application claims priority to U.S. Provisional Patent Application Ser. No. 63/030,201 filed on May 26, 2020, the contents of which are incorporated by reference herein in their entirety.

BACKGROUND OF THE INVENTION

SEE (Single Event Effect) refers to a category of random events resulting from various atmospheric, solar and/or galactic sourced particles, which disrupt the operation of solid-state devices. SEEs may cause a microprocessor to jump to a wrong instruction, compute a wrong value and/or erroneously update a register file or data memory. It is known that solid-state devices susceptibility to SEEs increases with altitude and is therefore a significant consideration for the space and avionics communities. However, with shrinking silicon geometries and increased device densities in recent years, the statistical probability of SEEs has increased and is becoming a consideration for deployments at sea level. Single Event Transient (SET) and Single Event Upset (SEU) are two classes of SEEs which may adversely affect logic circuits.

Mitigation techniques are known in the art for reducing SEEs, including Double Modular Redundancy (DMR) and Triple Modular Redundancy (TMR), repetition with error detection, checkpoint and recovery, watch-dog timer techniques and Error Detection and Correction (EDAC) protection for memory devices.

Dual Core in Lockstep is a method of grouping two independent and identical processor cores to implement Dual Modular Redundancy (DMR), thereby providing for the detection of an error occurring in one of the two processors. The two processors are initialized to the same state during system start-up and they receive the same inputs and execute the same instruction stream, at the same time, when they are operating in lockstep. So, during normal operation, the state of the two processors is identical, clock-by-clock. Lockstep processing assumes that an error in either processor will result in a difference between the states of the two processors, which will eventually be manifested as a difference in the outputs of the processor cores. When an internal error occurs in one of the processor cores, the actions of the cores will be different following the internal error, which may result in the processor cores falling out of lockstep.

Lockstep monitors are known in the art that detect the outputs of the dual processors operating in lockstep and that signal an error when a discrepancy between the outputs is detected. However, in the prior art lockstep monitoring systems, the outputs of the lockstep processors are only compared at the system bus and recovering from a detected error that is detected on the system bus requires a system reset of both processors. Performing a reset results in an interruption of service and necessitates added system design complexity to mitigate the effects of interruption. While other techniques are known that utilize a saved software checkpoint to recover the state of the processors and continue execution, these other techniques require modifications to the software and reduce processing throughput.

According, what is needed in the art is an improved system and method for detecting errors in pipelined processing steps executing in lockstep processors. Additionally, an improved method for recovering from a detected mismatch of the pending pipelined instruction is needed.

SUMMARY OF THE INVENTION

In various embodiments, the present invention provides an improved system and method for identifying pipelined processing mismatches in two processors operating in lockstep and provides an auto-recovery operation for the processors when a mismatch is detected.

In one embodiment, the present invention provides a method which includes, receiving, at a lockstep monitor, a first pending instruction generated by a first processor executing pipelined instructions and receiving, at the lockstep monitor, a second pending instruction generated by a second processor executing the pipelined instructions in lockstep with the first processor. The method further includes, comparing the first pending instruction and the second pending instruction at the lockstep monitor to detect a mismatch and when a mismatch is detected, performing an auto-recovery operation at the first processor and at the second processor to prevent the first processor from executing the first pending instruction and to prevent the second processor from executing the second pending instruction.

The auto-recovery operation at the first processor and at the second processor may further includes, generating a flush and re-execute interrupt at the lockstep monitor transmitting the flush and re-execute interrupt to the first processor and to the second processor flushing the pipelined instructions responsive to the transmitted flush and re-execute interrupt and re-executing the flushed pipelined instructions responsive to the transmitted flush and re-execute interrupt.

In particular embodiment, first pending instruction and the second pending includes may be one or more of a pending instruction fetch address, a pending write address and pending write data.

In an additional embodiment, the present invention provides a system including, a first processor executing pipelined instructions, a second processor executing the pipelined instructions in lockstep with the first processor and a lockstep monitor coupled to the first processor and to the second processor. The lockstep monitor includes checkpoint circuitry to receive a first pending instruction from the first processor and a second pending instruction from the second processor. The checkpoint circuitry of the lockstep monitor compares the first pending instruction and the second pending instruction to detect a mismatch. The system further includes auto-recovery circuitry coupled to the checkpoint circuitry. When a mismatch is detected by the checkpoint circuitry, the auto-recovery circuitry initiates an auto-recovery operation at the first processor and at the second processor to prevent the first processor from executing the first pending instruction and to prevent the second processor from executing the second pending instruction.

Accordingly, the present invention provides a system and method for detecting errors in pipelined processing steps executing in lockstep processors. Additionally, an improved method for recovering from a detected mismatch of the pending pipelined instruction is provided.

DETAILED DESCRIPTION OF THE INVENTION

In various embodiments, the present invention provides a system and method for detecting pending instruction mismatches at various points in the instruction pipeline of dual, identical, processors operating in lockstep. The present invention additionally provides a system and method for performing auto-recovery of the dual processors if a mismatch is detected, thereby avoiding a potential loss of lockstep that would require a reset of both processors, prior to resuming lockstep processing. The present invention detects SEE failures early in the pipeline and applies an appropriate correction. The present invention does not require storing software checkpoints during the execution of pipelined instruction at the dual processors and substantially reduces the probability of the processors requiring a reset if they fall out of lockstep due to an error in one of the processors.

Figure 1:
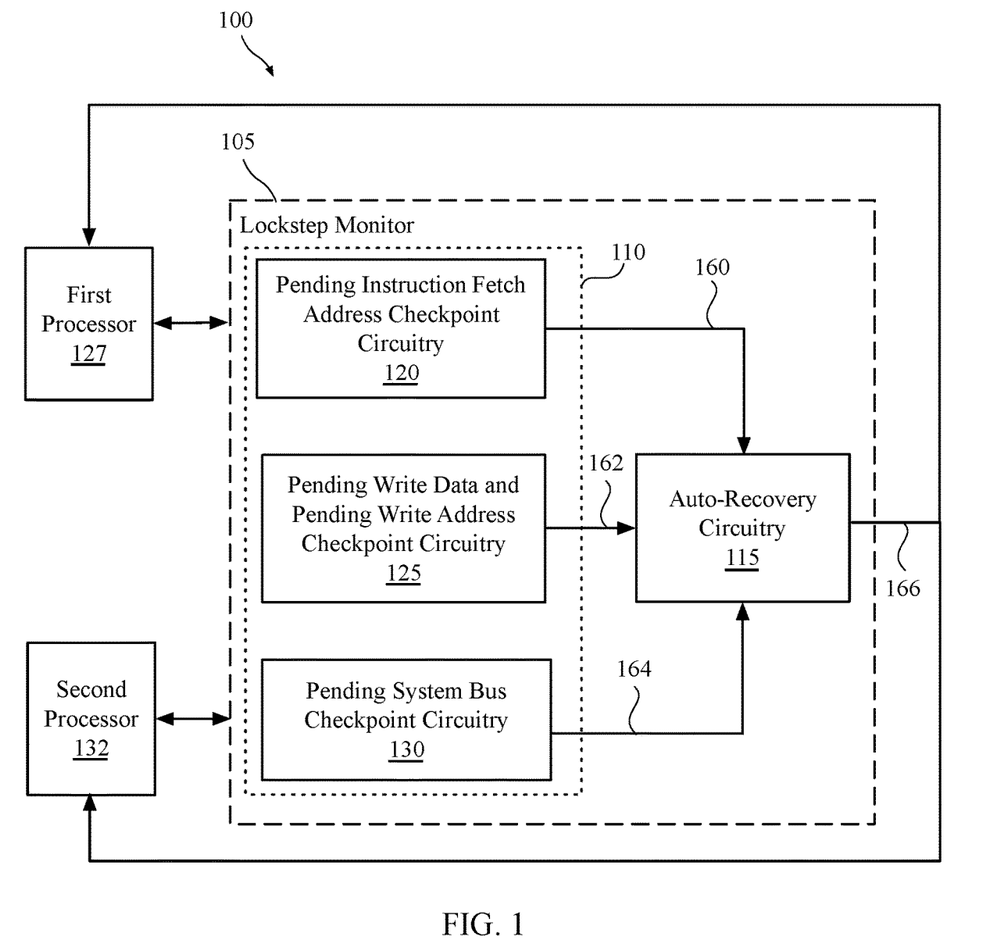
FIG. 1 is a block diagram illustrating a lockstep monitor in accordance with an embodiment of the present invention.

With reference to FIG. 1, a system 100 for performing mismatch detection and auto-recovery of dual processors operating in lockstep includes a lockstep monitor 105 coupled to a first processor 127 and to a second processor 132. It is assumed that the first and second processors 127, 132 are identical and are operating in lockstep, and as such they are executing the same sequence of pipelined instructions on a clock-by-clock basis. In a particular embodiment, the system 100 for performing mismatch detection and auto-recovery of first and second processors 127, 132 operating in lockstep may be implemented in an integrated circuit, such as a system on a chip (SOC) field-programmable gate array (FPGA). The lockstep monitor 105 is effective in detecting a mismatch in pending instructions that may potentially result in a loss of lockstep between the first and second processors 127, 132. The lockstep monitor 105 is additionally effective in performing auto-recovery of the first and second processors 127, 132 when a mismatch is detected, thereby avoiding the need to perform a reset of the first and second processors 127, 132.

In the following descriptions of the invention, it is assumed that there is zero clock-offset between the first and second processors 127, 132 when operating in lockstep. However, the embodiments could be extended to allow for a clock-offset between the first and second processors 127, 132. Allowing a clock-offset lockstep processing is known in the art, with a tradeoff of increased complexity and reduced throughput.

The lockstep monitor 105 includes checkpoint circuitry 110 and auto-recovery circuitry 115. The checkpoint circuitry 110 further includes pending instruction fetch address checkpoint circuitry 120, pending write data and pending write address checkpoint circuitry 125 and pending system bus checkpoint circuitry 130. The lockstep monitor 105 establishes hardware checkpoints at the first processor 127 and at the second processor 132 to detect a mismatch between a pending instruction to be executed by the first processor 127 and a pending instruction to be executed by the second processor 132 during the lockstep execution of the pipelined instructions. The lockstep monitor 105 additionally initiates an auto-recovery of the lockstep first and second processors 127, 132, when a mismatch is detected.

In operation of the system 100 of the present invention, when the first processor 127 and the second processor 132 are operating in lockstep, the lockstep monitor 105 performs hardware checks on the pending instructions to be executed by each of the first and second processors 127, 132 to determine if a mismatch between the pending instructions exists. The hardware checks may be performed every clock cycle to provide for the finest granularity in error detection. Alternatively, the hardware checks may be performed at regular predetermined intervals instead of every clock cycle.

In a specific embodiment, the pending instruction fetch address checkpoint circuitry 120 may receive a first pending instruction fetch address from the first processor 127 and a second pending instruction fetch address from the second processor 132, wherein both first and second processors 127, 130 are executing the same pipelined instructions in lockstep. The pending instruction fetch address checkpoint circuitry 120 compares the received first pending instruction fetch address and the received second pending instruction fetch address to determine if there is a mismatch between the instructions. When a mismatch is detected, the pending instruction fetch address checkpoint circuitry 120 provides a signal 160 to the auto-recovery circuitry 115 that a mismatch has been detected. The auto-recovery circuitry 115 then sends a flush and re-execute interrupt 166 to the first processor 127 and to the second processor 132 to perform an auto-recovery operation. In response to receiving the flush and re-execute interrupt 166, the first processor 127 and the second processor 132 flush their pipelined instructions and re-execute the flushed pipelined instructions, without requiring a reset of the processors 127, 132. As such, in response to the flush and re-execute interrupt 166, the auto-recovery operation prevents the first processor 127 from executing the first pending instruction fetch address and prevents the second processor 132 from executing the second pending instruction fetch address in response to receiving the flush an re-execute interrupt 166.

In another embodiment, the pending write data and pending write address checkpoint circuitry 125 may receive a first pending write data or first pending write address from the first processor 127 and a second pending write data or second pending write address from the second processor 132, wherein both first and second processors 127, 132 are executing the same pipelined instructions in lockstep. The pending write data and pending write address checkpoint circuitry 125 compares the received first pending write data or first pending write address and the received second pending write data or second pending write address, respectively, to determine if there is a mismatch between the pending write data or pending write addresses. When a mismatch is detected, the pending write data and pending write address checkpoint circuitry 125 provides a signal 162 to the auto-recovery circuitry 115 that a mismatch has been detected. The auto-recovery circuitry 115 then sends the flush and re-execute interrupt 166 to the first processor 127 and to the second processor 132 to perform an auto-recovery operation. In response to receiving the flush and re-execute interrupt 166, the first processor 127 and the second processor 132 flush their pipelined instructions and re-execute the flushed pipelined instructions, without requiring a reset of the first and second processors 127, 132. As such, in response to the flush and re-execute interrupt 166, the auto-recovery operation prevents the first processor 127 from writing the first pending write data or writing to the first pending write address and prevents the second processor 132 from writing the second pending write data or writing to the second pending write address.

In an additional embodiment, the pending system bus checkpoint circuitry 130 may receive a first pending instruction from the first processor 127 and a second pending instruction from the second processor 132, wherein both first and second processors 127, 130 are executing the same pipelined instructions in lockstep. The pending system bus checkpoint circuitry 130 compares the received first pending instruction and the received second pending instruction to determine if there is a mismatch between the pending instructions. When a mismatch is detected, the pending write data and pending write address checkpoint circuitry 125 provides a signal 164 to the auto-recovery circuitry 115 that a mismatch has been detected. The auto-recovery circuitry 115 then sends the flush and re-execute interrupt 166 to the first processor 127 and to the second processor 132 to perform an auto-recovery operation. In response to receiving the flush and re-execute interrupt 166, the first processor 127 and the second processor 132 flush their pipelined instructions and re-execute the flushed pipelined instructions, without requiring a reset of the first and second processors 127, 132. As such, in response to the flush and re-execute interrupt 166, the auto-recovery operation prevents the first processor 127 from executing the first pending instruction and prevents the second processor 132 from executing the second pending instruction.

As will be described in additional detail below, the lockstep monitor 105 of the present invention is used to detect a mismatch between pending instructions at various points in the data pipelines of the dual processors operating in lockstep. The present invention detects SEE failures early in the pipeline and applies an appropriate correction. Additionally, the hardware of the lockstep monitor 105 is effective in notifying the lockstep first and second processors 127, 132 of the mismatch by sending a flush and re-execute interrupt that will prevent the first and second processors 127, 132 from executing the pending instructions involved in the detected mismatch. The invention takes advantage of existing flush and re-execute interrupts commonly known in computer architecture for addressing branch mispredictions. Microarchitectures that support branch prediction/mispredictions are exploited by instructing the first and second processors 127, 132 to perform a re-execution of one or more instructions that were performed prior to detecting the mismatch. As such, recovery from an SEE is performed automatically in hardware using the auto-recovery operation and does not require system software changes to the processors. Implementation of the present invention allows for a high probability that the auto-recovery operation will be successful in maintaining lockstep in the processors and avoids a system reset which results in an undesirable interruption of service and added system design complexity to mitigate the effects of the interruption. The present invention also eliminates the need to implement software to periodically save the state of the first and second processors 127, 132 at regular intervals, without advance knowledge of when a fault may occur. Saving the state of the first and second processors 127, 132 to be able to restore to a saved state undesirably reduces throughput and requires significant changes to software code to implement in existing processor-based systems.

Figure 2:
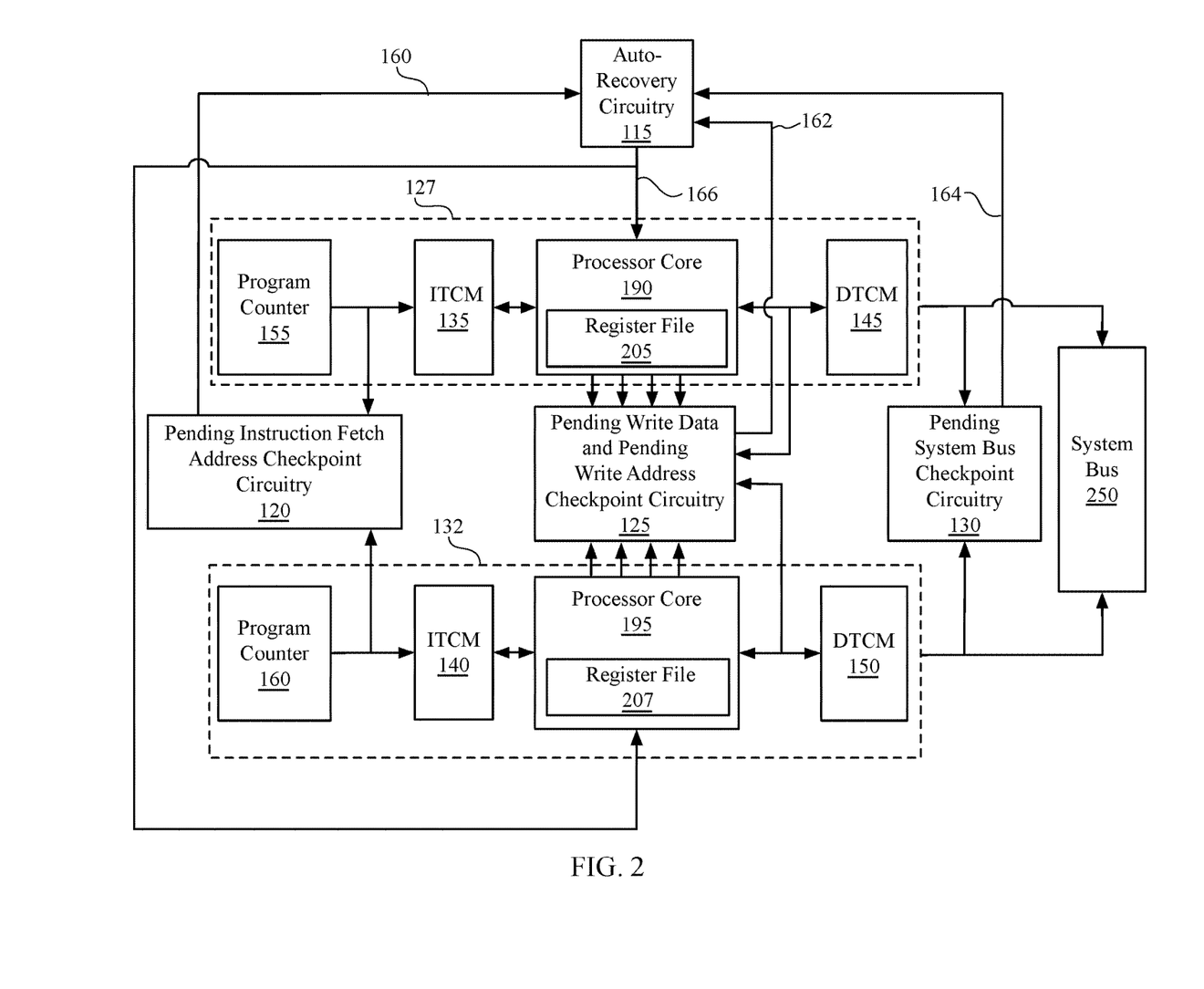
FIG. 2 is a block diagram illustrating the integration of the lockstep monitor with two identical processors operating in lockstep, in accordance with an embodiment of the present invention.

FIG. 2 further illustrates the interactions between the first and second processors 127, 132 operating in lockstep and the elements of checkpoint circuitry 110 of FIG. 1.

As shown in FIG. 2, the first processor 127 comprises a respective processor core 190, a respective register file 205, a respective instruction tightly controlled memory (ITCM) 135, a respective data tightly controlled memory (DTCM) 145 and a respective program counter 155. The second processor 132 comprises a respective processor core 195, a respective register file 207, a respective ITCM 140, a respective DTCM 150 and a respective program counter 160. ITCMs and DTCMs are commonly employed in computer architectures having separate storage and signal pathways for instructions and data. An ITCM and a DTCM are attached to different elements of the system bus, wherein an ITCM is coupled to the instruction bus and is used for storing executable instructions, and a DTCM is coupled to the data bus and is used for storing data. Accordingly, the processor core 190, fetches executable instructions from the ITCM 135, stores data at the DTCM 145 and fetches data from the DTCM 145. The processor core 195, fetches executable instructions from the ITCM 140, stores data at the DTCM 150 and fetches data from the DTCM 150. The respective program counters 155, 160 are registers that contain the address of the next instruction to be executed in the pipeline and are respectively coupled to the ITCM 135, 140.

The pending instruction fetch address checkpoint circuitry 120 provides the first opportunity in the pipeline process to detect a mismatch between the pending instructions executing on the two lockstep processors 127, 132. The pending instructions include pending instruction fetch addresses destined for the ITCMs of the processors. As shown, the pending instruction fetch address checkpoint circuitry 120 is coupled between the program counter 155 and the ITCM 135 of the first processor 127 and between the program counter 160 and the ITCM 140 of the second processor 132. As such, the pending instruction fetch address checkpoint circuitry 120 receives a first pending instruction fetch address from the program counter 155 that is destined for the ITCM 135 of the first processor 127 and receives a second pending instruction fetch address from the program counter 160 that is destined for the ITCM 140 of the second processor 132. For each of the first and second processors 127, 132, the pending instruction fetch address identifies the ITCM address that will be used to fetch the next instruction to be executed in the pipeline for that processor. The pending instruction fetch address checkpoint circuitry 120 compares the first pending instruction fetch address and the second pending instruction fetch address to detect a mismatch. Since the first and second processors 127, 132 are operating in lockstep, the first pending instruction fetch address and the second pending instruction fetch address should match, in the absence of an error. If the pending instruction fetch address checkpoint circuitry 120 detects a mismatch, the pending instruction fetch address checkpoint circuitry 120 provides signal 160 to the auto-recovery circuitry 115, and in response to the provided signal 160, auto-recovery circuitry 115 sends a flush and re-execute interrupt 166 to the first processor 127 and to the second processor 132 to prevent the first pending instruction fetch address from executing at the first processor 127 and to prevent the second pending instruction fetch from executing at the second processor 132. The pipelined instructions are flushed from the pipeline and re-executed on both first and second processors 127, 132. By identifying the difference between the pending instruction fetch addresses before being executed by the ITCMs 135, 140, the lockstep monitor 105 provides for recovery and continued lockstep operations between the first and second processors 127, 132 without requiring a time-consuming reset of the first and second processors 127, 132.

A second opportunity for the lockstep monitor 105 to detect mismatches in the pending instructions at the first processor 127 and the second processor 132 is provided by the pending write data and pending write address checkpoint circuitry 125. In response to monitoring a bus to identify executing instructions destined for the processor cores 190, 192, the pending write data and pending write address checkpoint circuitry 125 receives first pending write data or first pending write address from the first processor core 190 that is destined for the register file 205 or for the DTCM 145 of the first processor 127. Additionally, the pending write data and pending write address checkpoint circuitry 125 additionally receives second pending write data or second pending write address from the second processor core 195 that is destined for the register file 207 or for the DTCM 150 of the second processor 132. Pending write data is data that will be written to either the respective register file 205, 207 or the respective DTCM 145, 150 in the next executed pipelined instruction. Pending write addresses identify the address of the respective register file 205, 207 or the respective DTCM 145, 150 that the write data will be written to in the next executed pipelined instruction. The pending write data and pending write address checkpoint circuitry 125 compares the first pending write data and/or the first pending write address with the second pending write data and/or the second pending write address to detect a mismatch. Since the first and second processors 127, 132 are operating in lockstep, the first pending write data and the second pending write data should match, in the absence of an error. If the first pending write data does not match the second pending write data, a mismatch is detected. Additionally, or alternately, if the first pending write address does not match the second pending write address, a mismatch is detected. If the pending write data and pending write address checkpoint circuitry 120 detects a mismatch, the pending write data and pending write address checkpoint circuitry 125 sends signal 162 to the auto-recovery circuit 115 indicative that an auto-recovery operation should be initiated for the first processor 127 and the second processor 132, and in response to signal 162, auto-recovery circuit 115 sends flush and re-execute interrupt 166 to the first processor 127 and to the second processor 132 to prevent the first pending write data or the first pending write address from executing at the first processor 127 and to prevent the second pending write data or the second pending write address from executing at the second processor 132. The pipelined instructions are flushed from the pipeline and re-executed on both first and second processors 127, 132. By identifying the difference between the pending write data and/or the pending write addresses destined for the register files 205, 207 or the DTCMs 145, 150, the lockstep monitor 105 provides for recovery and continued lockstep operations between the first and second processors 127, 132 without requiring a time-consuming reset of the processors 127, 132.

A third opportunity for the lockstep monitor 105 to detect mismatches in the pending instructions at the first processor 127 and the second processor 132 is provided by the pending system bus checkpoint circuitry 130. The pending system bus checkpoint circuitry 130 receives a first pending instruction from the first processor 127 that is destined for the system bus 250. The pending system bus checkpoint circuitry 130 additionally receives a second pending instruction from the second processor 132 that is destined for the system bus 250. The pending system bus checkpoint circuitry 130 compares the first pending instruction and the second pending instruction to detect a mismatch. Since the first and second processors 127, 132 are operating in lockstep, the first pending instruction and the second pending instruction should match, in the absence of an error. If the first pending instruction does not match the second pending instruction, a mismatch is detected. If the pending system bus checkpoint circuitry 130 detects a mismatch, the pending system bus checkpoint circuitry 130 sends signal 164 to the auto-recovery circuit 115 indicative that an auto-recovery operation should be initiated for the first processor 127 and the second processor 132. In response to signal 164, the auto-recovery circuit 115 sends flush and re-execute interrupt 166 to the first processor 127 and to the second processor 132 to prevent the first pending instruction from executing at the first processor 127 and to prevent the second pending instruction from executing at the second processor 132. The pipelined instructions are flushed from the pipeline and re-executed on both processors 127, 132. By identifying a difference between the pending instructions before being executed on the processors 127, 132, the lockstep monitor 105 provides for recovery and continued lockstep operations between the processors 127, 132 without requiring a time-consuming reset of the processors 127, 132.

In the present invention, the auto-recovery circuitry 115 sends flush and re-execute interrupt 166 to the first and second processors 127, 132 when a mismatch of a pending instruction is detected, before committing an update (i.e. write) to the DTCM, the register or the system bus. Additionally, if the mismatch persists following the auto-recovery operation, the processors cores are halted, the system bus is isolated and a single event functional interrupt (SEFI) is triggered by auto-recovery circuitry 115 to reset the processors. In particular, the auto-recovery circuitry 115 transmits the SEFI to the processors 127, 132 to indicate that the auto-recovery operation failed to resolve the mismatch and a safety monitoring function is provided by the auto-recovery circuitry 115 as a fail-safe mechanism to address the persistence of a mismatch, which is an infrequent occurrence.

Additionally, when a mismatch of a pending instruction is detected, it is assumed that the pending instruction at one of the processors is correct, while the pending instruction at the other processor is incorrect. As such, after an auto-recovery operation is performed, the pending instruction at only one of the processors should be different than the pending instruction prior to the auto-recovery operation. To address the infrequent occurrence, wherein the pending instruction at both processors is different after the auto-recovery operation, the previous state of the hardware checkpoints resulting from the mismatch are saved at the lockstep monitor 105 and compared to a current state of the hardware checkpoints after auto-recovery is attempted. As such, if the current state is different than the previous state on both processor cores, a SEFI is triggered, even if the mismatch did not persist after the auto recovery.

Figure 3:
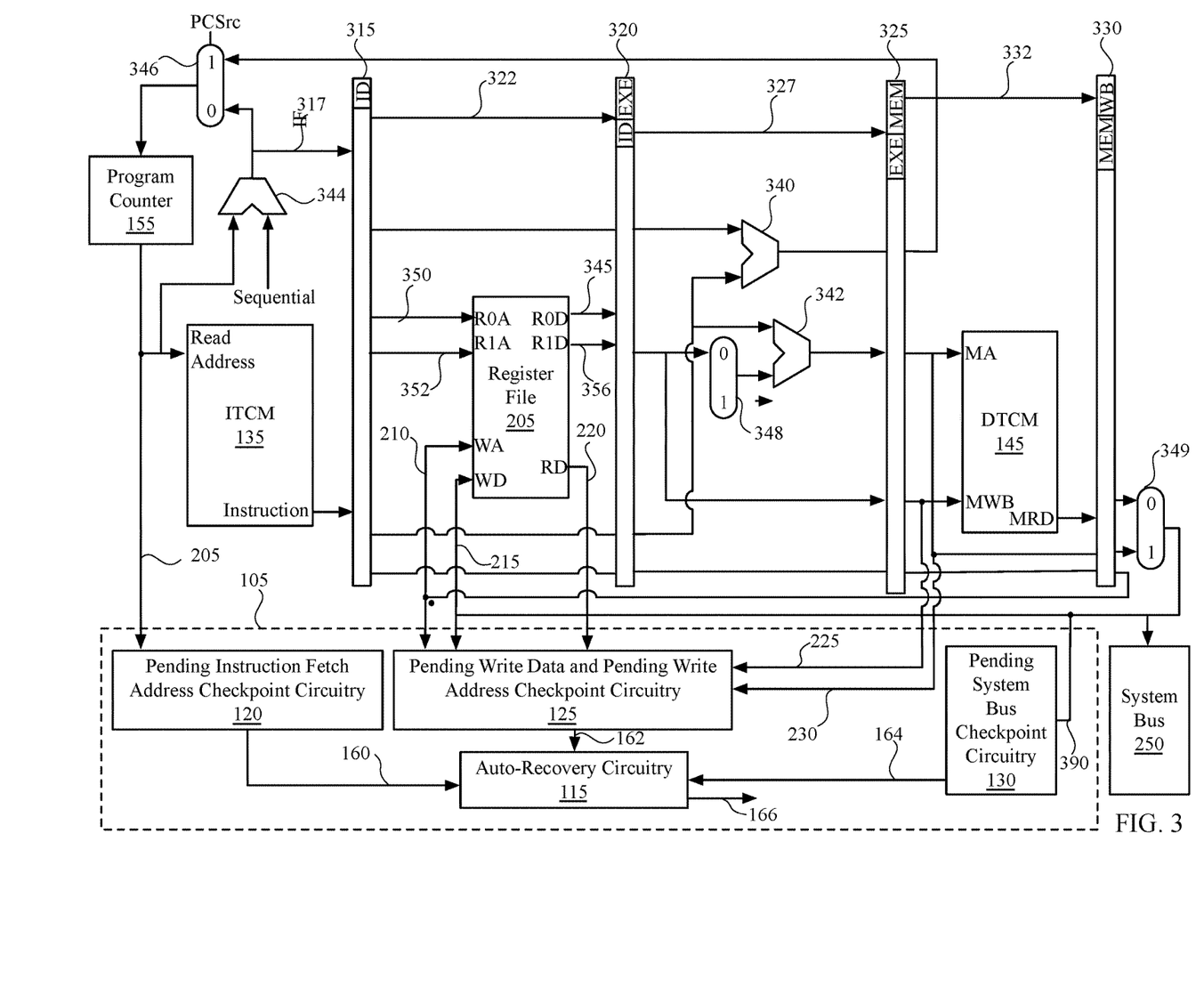
FIG. 3 is a block diagram illustrating the pipeline processing of one of the lockstep processors and the interaction of the lockstep monitor with the pipelined processing of the processor, in accordance with an embodiment of the present invention.

FIG. 3 illustrates an exemplary processor pipeline executing in the first processor 127 and the relationship between the first processor 127 and the lockstep monitor 105. While the operation of the first processor 127 is described in detail below, it is understood that the second processor 132 is operating in lockstep with the first processor 132 and that the lockstep monitor 105 is interacting with both the first processor 127 and the second processor 132 to detect pending instruction mismatches.

As is well known in the art, the single-cycle data path of each of the first and second processors 127, 130 is partitioned into five functional units separated by control buffers. The instruction fetch (IF) functional unit is separated from the instruction decode (ID) functional unit by the IF-ID buffer 315. The ID functional unit is separated from the execution state (EX) functional unit by the ID-EX buffer 320. The EX functional unit is separated from the memory cycle (MEM) functional unit by the EX-MEM buffer 325 and the MEM functional unit is separated from the write back (WB) functional unit by the MEM-WB buffer 330. The buffers 315, 320, 325, 330 store the results of the previous stage so that the results can be used in the next clock cycle. The control lines 317, 322, 327, 332 are used to route data to the functional elements in the circuitry, such as the register file 205 and DTCM 145. Arithmetic logic units (ALU) 340, 342, 344 and control signal logic 346, 348, 349 also contribute to maintaining the pipeline processing at the first processor 127.

When processors are operating in lockstep, the logical states of the cores track and remain in sync. The complete logical state of the core can be separated into persistent components, such as command and status registers, program counters and register files, and transient components, such as the execution pipeline and data memory. The system and method of the present invention tracks the instruction flow through the pipeline of the processors operating in lockstep. Early detection of a pending instruction mismatch in the pipeline prevents the failure from propagating forward in the pipeline and provide an opportunity to perform an auto-recovery without explicit intervention in the software.

As shown in FIG. 3, the program counter 155 of the first processor 127 is coupled to the ITCM 135 of the first processor 127. During pipeline execution, the program counter 155 provides a pending instruction fetch address 205 to the ITCM 135. Upon receiving the pending instruction fetch address 205 at a read address of the ITCM 135, the ITCM 135 may respond by providing the instruction corresponding to the pending instruction fetch address 205 to the instruction fetch IF-ID buffer 315.

The instruction may be decoded, and the results provided as inputs 350, 352 to register file 205. In response, register file 205 may provide outputs 345, 356 to the ID-EXE buffer 320. Following execution in the EX functional unit comprising ALUs 340, 342 and control signal logic 348, without limitation, the results may be provided to the EXE-MEM buffer 325. Resulting data 230 may then be written to the DTCM 145 at a specified write address 225. Data stored at the DTCM 145 is buffered at the MEM-WB buffer 330 and subsequently provided at the output of the control signal logic 340 as write back data 215 to the register file 205 at the specified write address 210 provided by the MEM-WB buffer 330.

In the present invention, the lockstep monitor 105 provides hardware checkpoints at various locations in the processing pipeline. The pending instruction fetch address checkpoint circuitry 120 provides a hardware checkpoint for the pending instruction fetch address 205 that is destined for the ITCM 135. The pending write data and pending write address checkpoint circuitry 125 provides a hardware checkpoint for the pending write back data 215 and the pending specified write address 210 that are destined for the register file 205. The pending write data and pending write address checkpoint circuitry 125 also provides a hardware checkpoint for the specified write address 225 and the resulting 230 that are destined for the DTCM 145. The pending system bus checkpoint circuitry 130 provides a hardware checkpoint for pending instructions 390 from the system bus 250.

While the processing pipeline for the first processor 127 is only illustrated in FIG. 3, as previously described, the lockstep monitor 105 is also coupled to the second processor 132 to provide the same hardware checkpoints described with reference to FIG. 3 in relation to the first processor 127. As such, it follows that the pending instruction fetch address checkpoint circuitry 120 receives pending instruction fetch addresses destined for the respective ITCM 135, 140 from the processing pipeline of both the first processor 127 and the second processor 132. The pending instruction fetch address checkpoint circuitry 120 compares the received instruction fetch addresses from the processors to detect a mismatch. The pending write data and pending write address checkpoint circuitry 125 receives pending write data and pending write addresses destined for the respective register file 205, 207 or the respective DTCM 145, 150 from both the first processor and the second processor. The pending write data and pending write address checkpoint circuitry 125 then compares the received pending write data and/or pending write addresses from the processors to detect a mismatch. The pending system bus checkpoint circuitry 130 receives pending instructions destined for the system bus 250 from both the first processor 127 and the second processor 132. The pending system bus checkpoint circuitry 130 then compares the received pending instructions from the processors to detect a mismatch.

In a specific embodiment, depending upon when a pending write data mismatch is detected in the pipeline, it is possible to save the current content 220 of the register file 205 in a holding register of the pending write data and pending write address checkpoint circuitry 125 while the comparison is performed. If a mismatch is detected, the register file 205 can revert to the saved content 220 to reduce delay in performing the auto-recovery operation.

The results of the comparisons at the hardware checkpoints may then be used to perform an auto-recovery operation of the first and second processors 127, 132. In particular, upon the detection of a mismatch at the pending instruction fetch address checkpoint circuitry 120 a signal 160 is sent to notify the auto-recovery circuitry 115 to send a flush and re-execute interrupt 166 to the first and second processors 127, 132 to initiate an auto-recovery operation. Upon the detection of a mismatch at the pending write data and pending write address checkpoint circuitry 125 a signal 162 is sent to notify the auto-recovery circuitry 115 to send a flush and re-execute interrupt 166 to the first and second processors 127, 132 to initiate an auto-recovery operation. Upon the detection of a mismatch at the pending system bus checkpoint circuitry 130 a signal 164 is sent to notify the auto-recovery circuitry 115 to send a flush and re-execute interrupt 166 to the first and second processors 127, 132 to initiate an auto-recovery operation.

Figure 4:
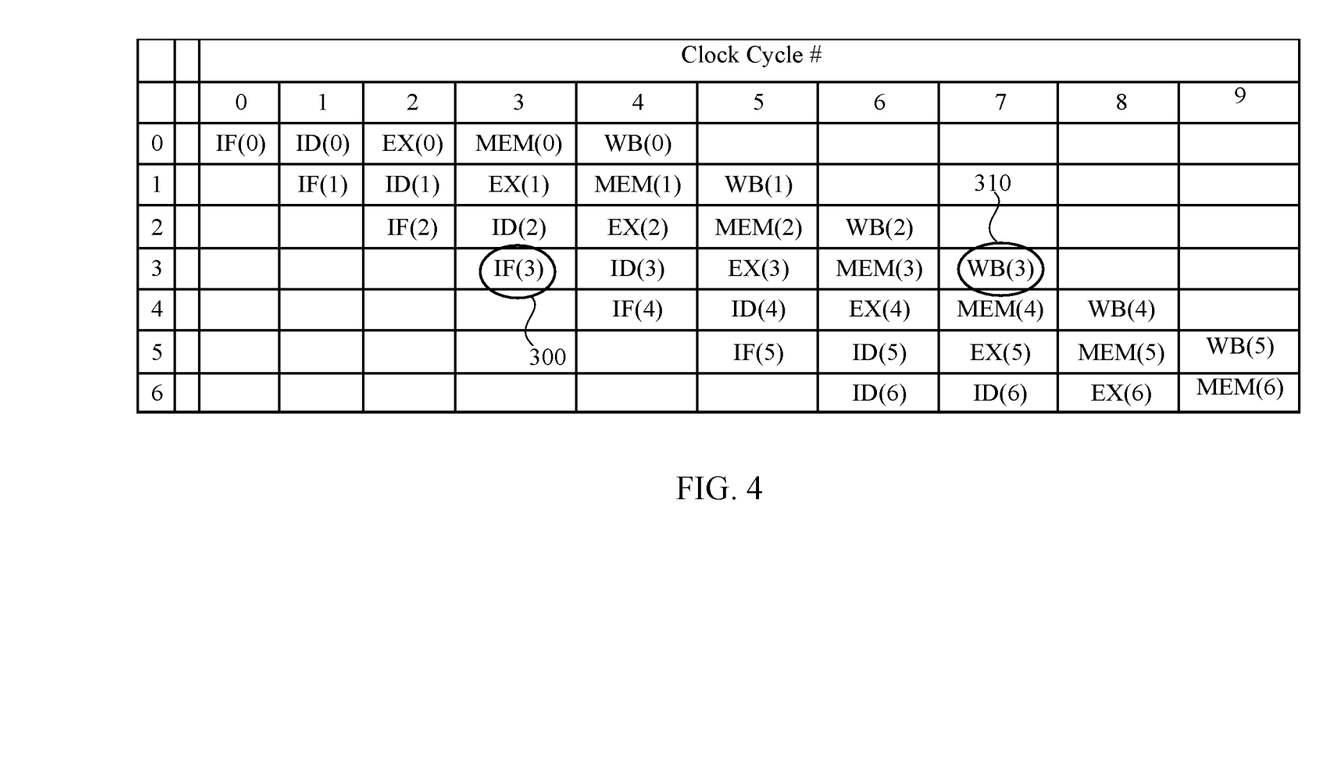
FIG. 4 is a table illustrating an exemplary pipeline of instructions for the lockstep processors, in accordance with an embodiment of the present invention.

FIG. 4 provides a table illustrating pipelined execution in the processors 127, 132 operating in lockstep. Pipelining improves efficiency by dividing the instructions into a fixed number of steps and each step is implemented as a pipelined segment. As shown, up to five instructions may be in flight in the pipeline. For example, during clock cycle 0, instruction fetch IF(0) may be performed and during clock cycle 1, the instruction fetched during clock cycle 0 can be decoded as ID(0) and a next instruction can be fetched as IF(1). It follows that at clock cycle 4 five instructions are in the pipeline, wherein instruction fetch IF(0) is now in the write back stage WB(0), instruction fetch IF(1) is in the memory stage MEM(1), instruction fetch IF(2) is in the execute state EXE(2), instruction fetch IF(3) is in the instruction decoding stage ID(3) and instruction fetch IF(4) is currently being fetched. It is known that the pipeline includes dependencies and hazard checks to ensure proper execution flow of the pipelined instructions. For simplification, conditional branches and branch predictions are not illustrated in this table. They key principle of the present invention for performing auto-recovery is to identify any SEE-induced faults early in the execution flow of the pipeline before committing a state change to the respective ITCM 135, 140, the respective DTCM 145, 150 or the respective register file 205, 207.

In an exemplary embodiment relating the table of FIG. 4 to FIG. 2, the pending instruction fetch address checkpoint circuitry 120 may detect a mismatch in the pipeline at 400 if the pending instruction fetch address during clock cycle 3, i.e. IF(3), denoted at 300, that is destined for the ITCM 135 of the first processor 127 does not match the pending instruction fetch address during the clock cycle 3 IF(3) that is destined for the ITCM 140 of the second processor 132. If the mismatch is detected, the pending instruction fetch address is not executed at the ITCMs 135, 140 and the pipeline instructions that would have been executed in the remaining clock cycles are flushed and re-executed.

In another exemplary embodiment relating the table of FIG. 4 to FIG. 2, the pending write data and pending address checkpoint circuitry 125 may detect a mismatch in the pipeline at 310 if the pending write back data or the pending specified write address during the clock cycle 7 WB(3) that is destined for the register file 205 of the first processor 127 does not match the pending write back data or pending specified write address during the clock cycle 7 WB(3) that is destined for the register file 207 of the second processor 132. If the mismatch is detected, the pending write back data or the pending specified write address is not executed at the register files 205, 207, and the pipeline instructions that would have been executed in the remaining clock cycles are flushed and re-executed.

Figure 5:
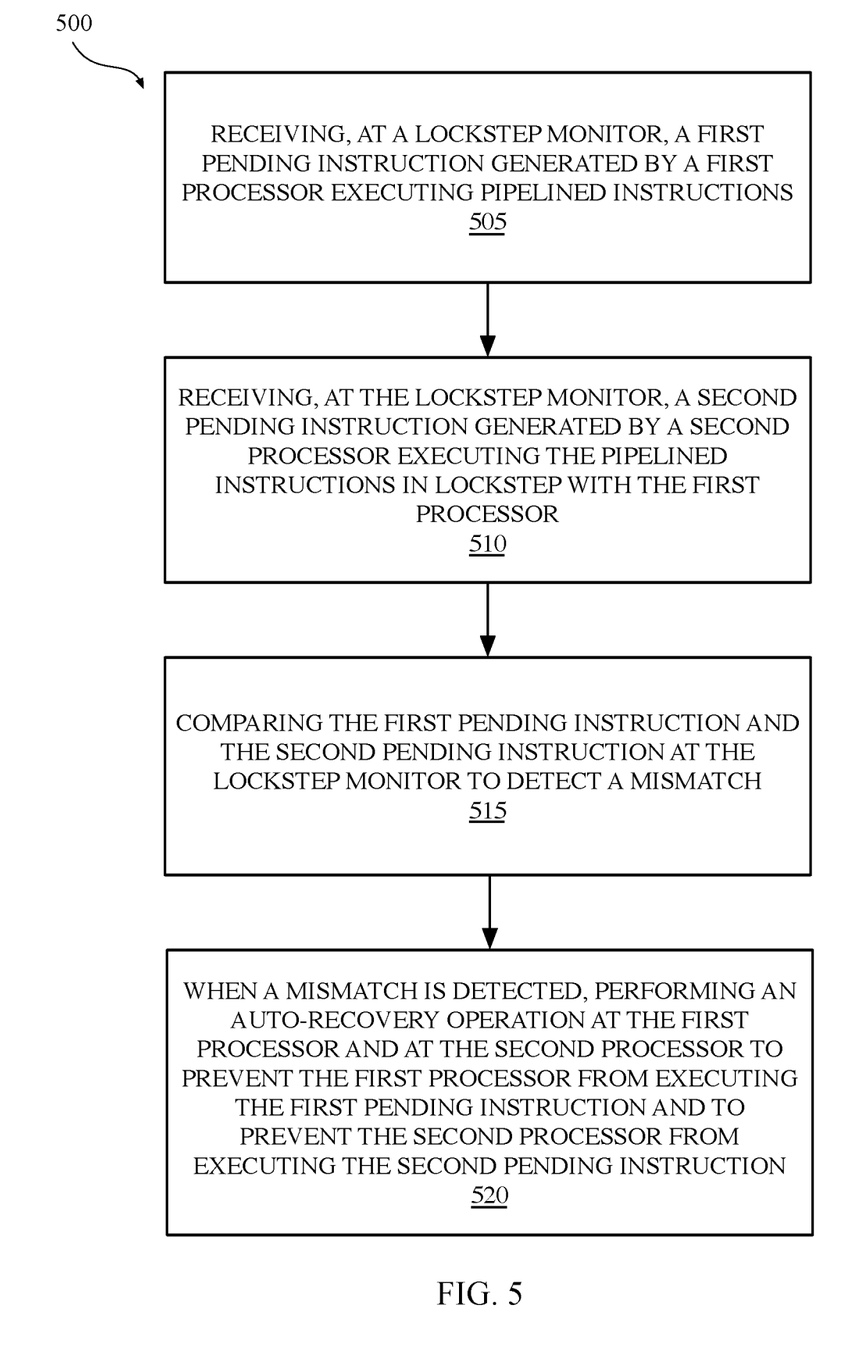
FIG. 5 is a flow diagram illustrating a method for detecting mismatches in pending pipelined instructions of processors operation in lockstep, in accordance with an embodiment of the present invention.

FIG. 5 is a flow diagram illustrating a method 500 for auto-recovery in processors operating in lockstep, in accordance with an embodiment of the present invention. At operation 505, the method begins by receiving, at a lockstep monitor, a first pending instruction generated by a first processor executing pipelined instructions. With reference to FIG. 1, a lockstep monitor 105 is coupled to a first processor 127 to receive a first pending instruction generated by the first processor 127.

At operation 510, the method continues by receiving, at the lockstep monitor, a second pending instruction generated by a second processor executing the pipelined instructions in lockstep with the first processor. With reference to FIG. 1, the lockstep monitor 105 is coupled to a second processor 132 to receive a second pending instruction generated by the second processor 132.

The method continues at operation 515, by comparing the first pending instruction and the second pending instruction at the lockstep monitor to detect a mismatch. With reference to FIG. 1, the lockstep monitor 105 comprises circuitry for comparing the first pending instruction and the second pending instruction.

At operation 520, the method concludes when a mismatch is detected, by performing an auto-recovery operation at the first processor and at the second processor to prevent the first processor from executing the first pending instruction and to prevent the second processor from executing the second pending instruction.

Figure 6:
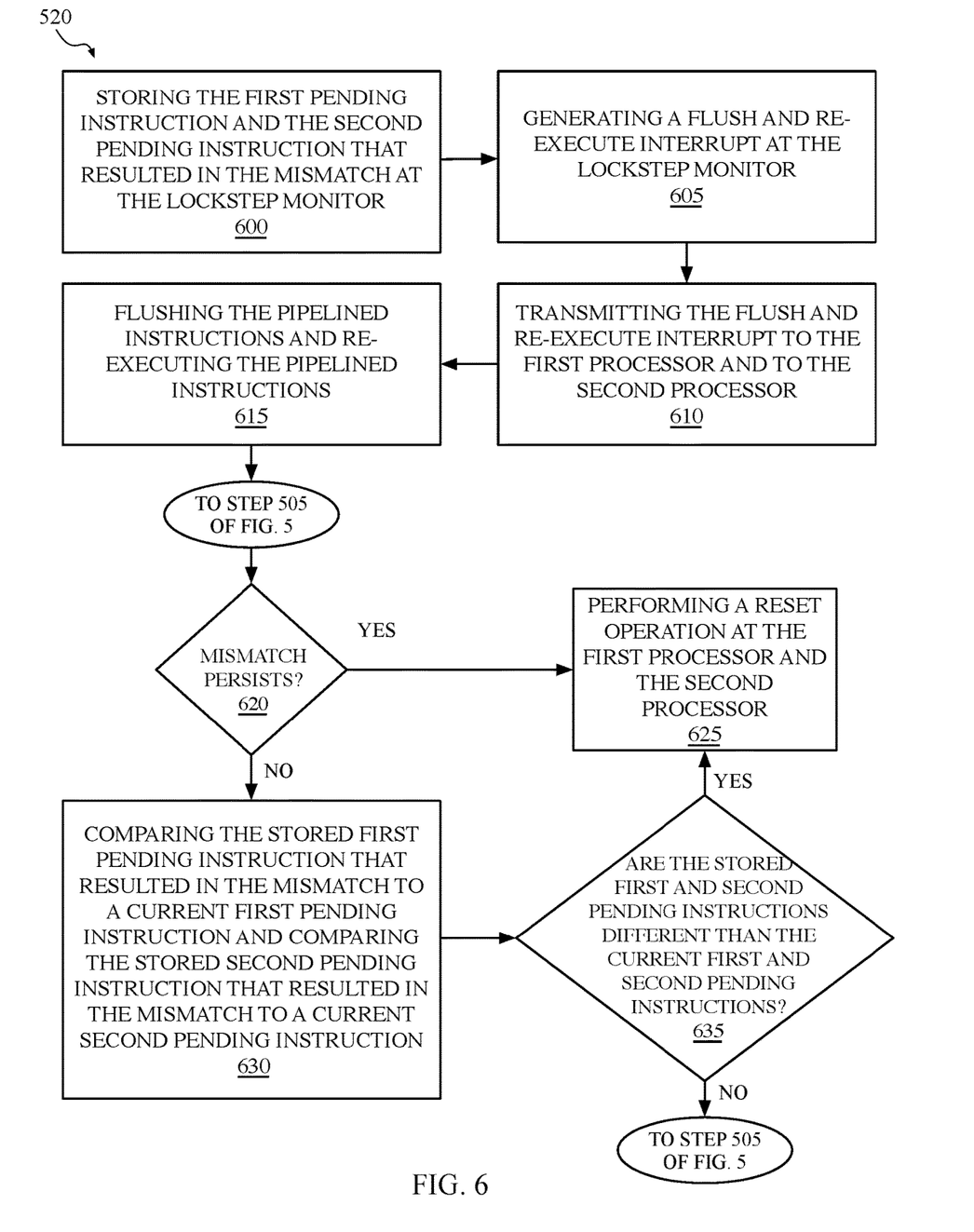
FIG. 6 is a flow diagram illustrating the steps performed during an auto-recovery operation when a mismatch between the two lockstep processors is detected, in accordance with an embodiment of the present invention.

FIG. 6 is a flow diagram describing the auto-recovery operation 520 of the present invention in more detail. At operation 600, the method includes storing the first pending instruction and the second pending instruction that resulted in the mismatch at the lockstep monitor. With reference to FIG. 1, the lockstep monitor 105 may include memory and associated circuitry for storing the first pending instruction and the second pending instruction.

At operation 605, the method continues by generating a flush and re-execute interrupt at the lockstep monitor 605 and at operation 610 by transmitting the flush and re-execute interrupt to the first processor 127 and to the second processor 132. With reference to FIG. 1, the lockstep monitor 105 may include auto-recovery circuitry 115 for generating a flush and re-execute interrupt 166 and for transmitting the flush and re-execute interrupt 166 to the first processor 127 and to the second processor 132.

The method continues at operation 615 by flushing the pipelined instructions and re-executing the pipelined instructions 615. With reference to FIG. 1, upon receiving the flush and re-execute interrupt 166 from lockstep monitor 105, the first processor 127 and the second processor 132 proceed by flushing their pipelined instructions and re-executing the pipelined instructions to recover from the detected mismatch. Exemplary pipelined instructions executed by the first processor 127 and by the second processor 132 are shown in FIG. 4.

Following the performance of the auto-recovery operation, the comparison processes repeats at operation 505 of FIG. 5. At operation 620, if the mismatch persists after the comparisons are made again, the method continues at operation 625 by performing a reset of the first processor and the second processor. With reference to FIG. 1, the lockstep monitor 105 initiates a reset of the first processor 127 and the second processor 132 if a mismatch persists after the auto-recovery has been performed.

Alternatively, if the mismatch does not persist at operation 620, the method continues at operation 630 by comparing the stored first pending instruction that resulted in the mismatch to a current first pending instruction and comparing the stored second pending instruction that results in the mismatch to a current second pending instruction. With reference to FIG. 1, the lockstep monitor 105 compares the instructions stored in memory to the current pending instructions resulting from the most recent comparison operations in FIG. 5.

The method continues at operation 635. If the stored first and second pending instructions are both different than the respective current first and second pending instructions, a reset operation is performed at the first processor and the second processor at operation 625. Alternatively, if only one of the stored first and second pending instructions are the same as the current first and second pending instructions, a reset operation is not performed, and the method continues at operation 505 of FIG. 5. By storing the pending instructions that resulted in a mismatch and then comparing the stored pending instructions to the current pending instructions, the method protects from a situation where there is not a mismatch between the current pending instructions at the processors but neither of the processors has a current pending instruction that matches the previous pending instructions.

Figure 7:
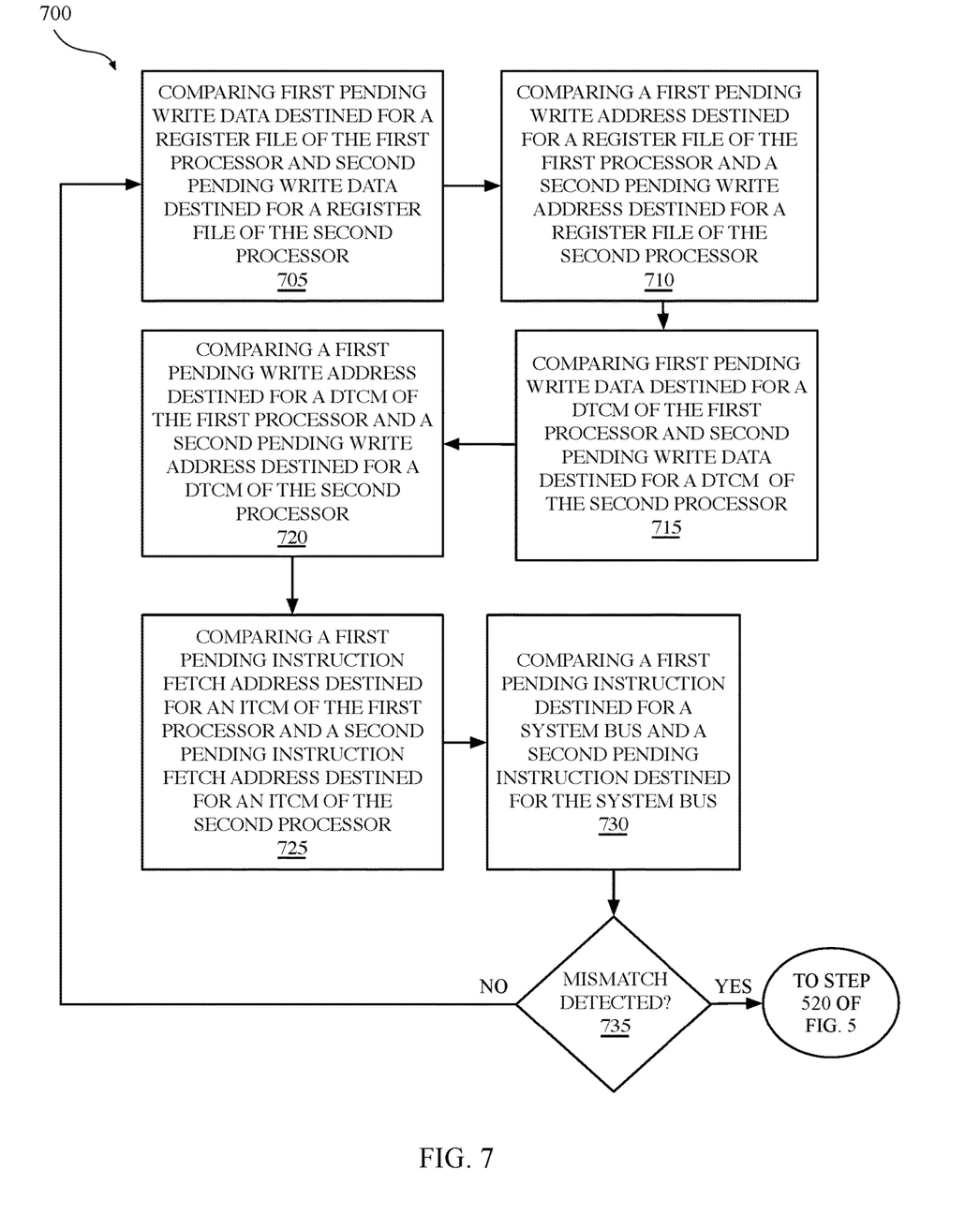
FIG. 7 is a flow diagram illustrating the comparisons performed by the lockstep monitor to detect mismatches in pending instructions executing in lockstep monitors, in accordance with an embodiment of the present invention.

FIG. 7 is a flow diagram 700 providing a more detailed description of the comparison operations of operation 515 of FIG. 5.

At operation 705, the method begins by comparing first pending write data destined for a register file of the first processor and second pending write data destined for a register file of the second processor. With reference to FIG. 2, the pending write data and pending write address checkpoint circuitry 125 of the lockstep monitor compares the first pending write data destined for the register file 205 of the first processor 127 and the second pending write data destined for the register file 207 of the second processor 132.

At operation 710, the method continues by comparing a first pending write address destined for a register file of the first processor and a second pending write address destined for a register file of the second processor. With reference to FIG. 2, the pending write data and pending write address checkpoint circuitry 125 of the lockstep monitor compares the first pending write address destined for the register file 205 of the first processor 127 and the second pending write address destined for the register file 207 of the second processor 132.

The method continues at operation 715 by comparing first pending write data destined for a DTCM of the first processor and second pending write data destined for a DTCM of the second processor. With reference to FIG. 2, the pending write data and pending write address checkpoint circuitry 125 of the lockstep monitor compares the first pending write data destined for the DTCM 145 of the first processor 127 and the second pending write data destined for the DTCM 150 of the second processor 132.

The method continues at operation 720 by comparing first pending write address destined for a DTCM of the first processor and second pending write address destined for a DTCM of the second processor. With reference to FIG. 2, the pending write data and pending write address checkpoint circuitry 125 of the lockstep monitor compares the first pending write address destined for the DTCM 145 of the first processor 127 and the second pending write address destined for the DTCM 150 of the second processor 132.

At operation 725, the method continues by comparing a first pending instruction fetch address destined for an ITCM of the first processor and a second pending instruction destined for an ITCM of the second processor. With reference to FIG. 2, the pending instruction fetch address checkpoint circuitry 120 of the lockstep monitor compares the first pending instruction fetch address destined for the ITCM 135 of the first processor 127 and the second pending instruction fetch address destined for the ITCM 140 of the second processor 132.

The method continues at operation 730 by comparing a first pending instruction destined for a system bus and a second pending instruction destined for the system bus. With reference to FIG. 2, the pending system bus checkpoint circuitry 130 of the lockstep monitor compares the first pending instruction destined for the system bus 250 and the second pending instruction destined for the system bus 250.

Following the completion of comparison operations 705, 710, 715, 720, 725 and 730, if a mismatch is detected at operation 735, the method proceeds to step 520 of FIG. 5, wherein an auto-recovery operation of the processors is initiated. Alternatively, if a mismatch is not detected at operation 735, the method continues back at operation 705 and the comparison operations are repeated until a mismatch is detected requiring an auto-recovery operation.

As such, the present invention provides an improved system and method for detecting mismatches in pipelined instructions of processors operating in lockstep that may cause the processors to fall out of lockstep. The prevent invention also provides an improved system and method for performing auto-recovery of the processors without requiring a time-consuming and complicated reset operation.

In one embodiment, portions of the lockstep circuitry may be implemented in an integrated circuit on a single semiconductor die. Alternatively, the integrated circuit may include multiple semiconductor die that are electrically coupled together such as, for example, a multi-chip module that is packaged in a single integrated circuit package.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention may be embodied on various computing platforms that perform actions responsive to software-based instructions. The following provides an antecedent basis for the information technology that may be utilized to enable the invention.

The method of the present invention may be stored on a computer readable medium which may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, processor, or other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What is claimed is:

1. A method comprising:
    receiving, at a lockstep monitor, a first pending instruction generated by a first processor executing pipelined instructions, wherein the first pending instruction is destined for one of a register file of the first processor, a data tightly controlled memory (DTCM) of the first processor, an instruction tightly controlled memory (ITCM) of the first processor or a system bus coupled to the first processor;
    receiving, at the lockstep monitor, a second pending instruction generated by a second processor executing the pipelined instructions in lockstep with the first processor;
    comparing the first pending instruction and the second pending instruction at the lockstep monitor to detect a mismatch; and
    when a mismatch is detected, performing an auto-recovery operation at the first processor and at the second processor to prevent the first processor from executing the first pending instruction and to prevent the second processor from executing the second pending instruction.

2. The method of claim 1, wherein the first pending instruction comprises one or more of a pending instruction fetch address, a pending write address and pending write data.

3. The method of claim 1, wherein the second pending instruction comprises one or more of a pending instruction fetch address, a pending write address and pending write data.

4. The method of claim 1, wherein the second pending instruction is destined for one of, a register file of the second processor, a DTCM of the second processor, an ITCM of the second processor and the system bus.

5. A method comprising:
    receiving, at a lockstep monitor, a first pending instruction generated by a first processor executing pipelined instructions, wherein the first pending instruction comprises a first pending instruction fetch address destined for an instruction tightly controlled memory (ITCM) of the first processor;
    receiving, at the lockstep monitor, a second pending instruction generated by a second processor executing the pipelined instructions in lockstep with the first processor, wherein the second pending instruction comprises a second pending instruction fetch address destined for an ITCM of the second processor;
    comparing the first pending instruction and the second pending instruction at the lockstep monitor to detect a mismatch, wherein the comparing detects a mismatch between the first pending instruction fetch address and the second pending instruction fetch address; and
    when a mismatch is detected, performing an auto-recovery operation at the first processor to prevent the first processor from fetching an instruction from the first pending instruction address at the ITCM of the first processor and to prevent the second processor from fetching an instruction from the second pending instruction address of the ITCM of the second processor.

6. A method comprising:
receiving, at a lockstep monitor, a first pending instruction generated by a first processor executing pipelined instructions, wherein the first pending instruction comprises a first pending write address destined for a data tightly controlled memory (DTCM) of the first processor;
receiving, at the lockstep monitor, a second pending instruction generated by a second processor executing the pipelined instructions in lockstep with the first processor, wherein the second pending instruction comprises a second pending write address destined for a DTCM of the second processor;
comparing the first pending instruction and the second pending instruction at the lockstep monitor to detect a mismatch, wherein the comparing detects a mismatch between the first pending write address and the second pending write address; and
when a mismatch is detected, performing an auto-recovery operation at the first processor to prevent the first processor from writing to the first pending write address at the DTCM of the first processor and to prevent, the second processor from writing to the second pending write address of the DTCM of the second processor.

7. A method comprising:
receiving, at a lockstep monitor, a first pending instruction generated by a first processor executing pipelined instructions, wherein the first pending instruction comprises a first pending write data destined for a data tightly controlled memory (DTCM) of the first processor;
receiving, at the lockstep monitor, a second pending instruction generated by a second processor executing the pipelined instructions in lockstep with the first processor, wherein the second pending instruction comprises a second pending write data destined for a DTCM of the second processor;
comparing the first pending instruction and the second pending instruction at the lockstep monitor to detect a mismatch, wherein the comparing detects a mismatch between the first pending write data and the second pending write data; and
when a mismatch is detected, performing an auto-recovery operation at the first processor to prevent the first processor from writing the first pending write data to the DTCM of the first processor and to prevent the second processor from writing the second pending write data to the DTCM of the second processor.

8. A method comprising:
receiving, at a lockstep monitor, a first pending instruction generated by a first processor executing pipelined instructions, wherein the first pending instruction comprises a first pending write address destined for a register file of the first processor;
receiving, at the lockstep monitor, a second pending instruction generated by a second processor executing the pipelined instructions in lockstep with the first processor, wherein the second pending instruction comprises a second pending write address destined for a register file of the second processor;
comparing the first pending instruction and the second pending instruction at the lockstep monitor to detect a mismatch, wherein the comparing detects a mismatch between the first pending write address and the second pending write address; and
when a mismatch is detected, performing an auto-recovery operation at the first processor to prevent the first processor from writing to the first pending write address of the register file of the first processor and to prevent the second processor from writing to the second pending write address of the register file of the second processor.

9. A method comprising:
receiving, at a lockstep monitor, a first pending instruction generated by a first processor executing pipelined instructions, wherein the first pending instruction comprises a first pending write data destined for a register file of the first processor;
receiving, at the lockstep monitor, a second pending instruction generated by a second processor executing the pipelined instructions in lockstep with the first processor, wherein the second pending instruction comprises a second pending write data destined for a register file of the second processor;
comparing the first pending instruction and the second pending instruction at the lockstep monitor to detect a mismatch, wherein the comparing detects a mismatch between the first pending write data and the second pending write data; and
when a mismatch is detected, performing an auto-recovery operation at the first processor to prevent the first processor from writing the first pending write data to the register file of the first processor and to prevent the second processor from writing the second pending write data to the register file of the second processor.

10. A method comprising:
receiving, at a lockstep monitor, a first pending instruction generated by a first processor executing pipelined instruction, wherein the first pending instruction is destined for a system bus coupled to the first processor;
receiving, at the lockstep monitor, a second pending instruction generated by a second processor executing the pipelined instructions in lockstep with the first processor, wherein the second pending instruction is destined for the system bus;
comparing the first pending instruction and the second pending instruction at the lockstep monitor to detect a mismatch, wherein the comparing detects a mismatch between the first pending instruction and the second pending instruction; and
when a mismatch is detected, performing an auto-recovery operation at the first processor and at the second processor to prevent the first processor from executing the first pending instruction and to prevent the second processor from executing the second pending instruction.

11. A method comprising:
receiving, at a lockstep monitor, a first pending instruction generated by a first processor executing pipelined instructions;
receiving, at the lockstep monitor, a second pending instruction generated by a second processor executing the pipelined instructions in lockstep with the first processor;
comparing the first pending instruction and the second pending instruction at the lockstep monitor to detect a mismatch; and
when a mismatch is detected, performing an auto-recovery operation at the first processor and at the second processor to prevent the first processor from executing the first pending instruction and to prevent the second processor from executing the second pending instruction, the performing the auto-recovery operation at the first processor and at the second processor further including:
generating a flush and re-execute interrupt at the lockstep monitor;
transmitting the flush and re-execute interrupt to the first processor and to the second processor;
flushing the pipelined instructions responsive to the transmitted flush and re-execute interrupt; and
re-executing the flushed pipelined instructions responsive to the transmitted flush and re-execute interrupt.

12. A method comprising:
receiving, at a lockstep monitor, a first pending instruction generated by a first processor executing pipelined instructions;
receiving, at the lockstep monitor, a second pending instruction generated by a second processor executing the pipelined instructions in lockstep with the first processor;
comparing the first pending instruction and the second pending instruction at the lockstep monitor to detect a mismatch;
when a mismatch is detected, performing an auto-recovery operation at the first processor and at the second processor to prevent the first processor from executing the first pending instruction and to prevent the second processor from executing the second pending instruction; and
after performing the auto-recovery operation at the first processor and at the second processor, performing a reset of the first processor and the second processor if the mismatch persists.

13. A method comprising:
receiving, at a lockstep monitor, a first pending instruction generated by a first processor executing pipelined instructions;
receiving, at the lockstep monitor, a second pending instruction generated by a second processor executing the pipelined instructions in lockstep with the first processor;
comparing the first pending instruction and the second pending instruction at the lockstep monitor to detect a mismatch;
when a mismatch is detected, storing, at the lockstep monitor, the first pending instruction and the second pending instruction that resulted in the mismatch;
when the mismatch is detected, performing an auto-recovery operation at the first processor and at the second processor to prevent the first processor from executing the first pending instruction and to prevent the second processor from executing the second pending instruction;
after performing the auto-recovery operation at the first processor and at the second processor, comparing the stored first pending instruction that resulted in the mismatch with a current first pending instruction and comparing the stored second pending instruction that resulted in the mismatch with a current second pending instruction; and
performing a reset of the first processor and the second processor if the stored first pending instruction is different than the current first pending instruction and the stored second pending instruction is different than the current second pending instruction.

14. A system comprising:
a first processor executing pipelined instructions, the first processor coupled to a system bus and including a register file, an instruction tightly controlled memory (ITCM) and a data tightly controlled memory (DTCM);
a second processor executing the pipelined instructions in lockstep with the first processor, the second processor coupled to the system bus and including a register file, an ITCM and a DTCM; and
a lockstep monitor coupled to the first processor and to the second processor, the lockstep monitor comprising;
checkpoint circuitry to receive a first pending instruction from the first processor and a second pending instruction from the second processor, the checkpoint circuitry to compare the first pending instruction and the second pending instruction to detect a mismatch; and
auto-recovery circuitry coupled to the checkpoint circuitry, when a mismatch is detected by the checkpoint circuitry, the auto-recovery circuitry to initiate an auto-recovery operation at the first processor and at the second processor to prevent the first processor from executing the first pending instruction and to prevent the second processor from executing the second pending instruction.

15. The system of claim 14, wherein the first pending instruction comprises one or more of a first pending instruction fetch address, a first pending write address and first pending write data and the second pending instruction comprises one or more of a second pending instruction fetch address, a second pending write address and second pending write data.

16. The system of claim 14, wherein the checkpoint circuitry further comprises:
pending instruction fetch address checkpoint circuitry to receive a first pending instruction fetch address destined for the ITCM of the first processor, to receive a second pending instruction fetch address destined for the ITCM of the second processor and to compare the first pending instruction fetch address and the second pending instruction fetch address to detect a mismatch;
pending write data and pending write address checkpoint circuitry to receive first pending write data destined for the register or the DTCM of first processor, to receive second pending write data destined for the register or the DTCM of the second processor and to compare the first pending write data and the second pending write data to detect a mismatch;
the pending write data and pending write address checkpoint circuitry further to receive a first pending write address destined for the register or the DTCM of first processor, to receive a second pending write address destined for the register or the DTCM of the second processor and to compare the first pending write address and the second pending write address to detect a mismatch; and
pending system bus check point circuitry to receive a first pending instruction destined for the system bus, to receive a second pending instruction destined for the system bus and to compare the first pending instruction and the second pending instruction to detect a mismatch.

17. A system comprising:
a first processor executing pipelined instructions;
a second processor executing the pipelined instructions in lockstep with the first processor;
a lockstep monitor coupled to the first processor and to the second processor, the lockstep monitor comprising;

checkpoint circuitry to receive a first pending instruction from the first processor and a second pending instruction from the second processor, the checkpoint circuitry to compare the first pending instruction and the second pending instruction to detect a mismatch; and auto-recovery circuitry coupled to the checkpoint circuitry, the auto-recovery circuitry to, when a mismatch is detected by the checkpoint circuitry, initiate an auto-recovery operation at the first processor and at the second processor to prevent the first processor from executing the first pending instruction and to prevent the second processor from executing the second pending instruction, the auto-recovery circuitry further to generate a flush and re-execute interrupt and transmit the flush and re-execute interrupt to the first processor and to the second processor.

18. The system of claim 17, the first processor and the second processor to:

receive the flush and re-execute interrupt from the auto-recovery circuitry;

flush the pipelined instructions in response to the interrupt; and re-execute the pipelined instructions.

* * * * *